US008512857B2

(12) United States Patent
Lawrence et al.

(10) Patent No.: US 8,512,857 B2
(45) Date of Patent: Aug. 20, 2013

(54) SECURITY LABEL

(75) Inventors: Christopher Robert Lawrence, Farnborough (GB); Eoin Seiorse O'Keefe, Farnborough (GB)

(73) Assignee: Qinetiq Limited (GB)

( * ) Notice: Subject to any disclaimer, the term of this patent is extended or adjusted under 35 U.S.C. 154(b) by 970 days.

(21) Appl. No.: 10/483,690

(22) PCT Filed: Jul. 2, 2002

(86) PCT No.: PCT/GB02/03043
§ 371 (c)(1),
(2), (4) Date: Jan. 12, 2004

(87) PCT Pub. No.: WO03/007276
PCT Pub. Date: Jan. 23, 2003

(65) Prior Publication Data
US 2004/0185232 A1 Sep. 23, 2004

(30) Foreign Application Priority Data
Jul. 13, 2001 (GB) ...................................... 0117096

(51) Int. Cl.
*B32B 5/16* (2006.01)

(52) U.S. Cl.
USPC .......... 428/323; 428/916; 283/72.81; 283/91; 283/101; 283/109; 283/110; 283/111

(58) Field of Classification Search
USPC ................ 428/323, 916; 283/72.81, 91, 101, 283/109, 110, 111
See application file for complete search history.

(56) References Cited

U.S. PATENT DOCUMENTS

| | | | | |
|---|---|---|---|---|
| 4,268,983 | A | 5/1981 | Cook | |
| 4,608,288 | A | 8/1986 | Spindler | |
| 4,705,300 | A | 11/1987 | Berning et al. | |
| 4,765,656 | A * | 8/1988 | Becker et al. | 283/70 |
| 4,799,137 | A | 1/1989 | Aho | |
| 5,009,486 | A | 4/1991 | Dobrowolski et al. | |
| 5,135,262 | A | 8/1992 | Smitjh et al. | |
| 5,510,171 | A | 4/1996 | Faykish | |
| 6,036,232 | A | 3/2000 | Kaule et al. | |
| 6,107,244 | A * | 8/2000 | Zeira et al. | 503/201 |
| 6,283,509 | B1 | 9/2001 | Braun et al. | |
| 6,399,228 | B1 * | 6/2002 | Simpson | 428/699 |
| 6,631,033 | B1 * | 10/2003 | Lewis | 359/584 |
| 6,712,397 | B1 | 3/2004 | Mayer et al. | |
| 7,230,764 | B2 * | 6/2007 | Mullen et al. | 359/619 |
| 2003/0179364 | A1 * | 9/2003 | Steenblik et al. | 356/71 |
| 2004/0050269 | A1 | 3/2004 | Adamczyk et al. | |

FOREIGN PATENT DOCUMENTS

| | | | |
|---|---|---|---|
| EP | 0 170 439 | | 2/1986 |
| EP | 0 341 002 | | 11/1989 |
| EP | 1 147 878 | A2 * | 10/2001 |
| EP | 1 226 308 | | 7/2002 |
| GB | 1346915 | | 2/1974 |
| WO | WO 92/08998 | | 5/1992 |
| WO | WO99/19150 | | 4/1999 |
| WO | WO 01/03945 | | 1/2001 |
| WO | WO 01/53113 | | 7/2001 |

* cited by examiner

*Primary Examiner* — Betelhem Shewareged
(74) *Attorney, Agent, or Firm* — McDonnell Boehnen Hulbert & Berghoff LLP

(57) ABSTRACT

This invention relates to a security label for the detection of counterfeiting and tampering. The invention comprises a combination of an iridescent laminated or multilayered material with a lenticular layer. The iridescent layer exhibits an angular dependence in its coloration in reflection and/or transmission and the lenticular layer acts as a filter to light of a given angle of incidence.

8 Claims, 3 Drawing Sheets

SECURITY LABEL

Anti-counterfeit labels operate by utilising the detectable and predetermined specific physical characteristics of materials that are difficult to replicate without prior knowledge on the part of the counterfeiter. The association of the label attached to the goods in question enables the retailer or consumer to determine whether the goods are indeed genuine. Anti-forgery devices behave in a similar manner, but in addition possess an anti-tamper capacity which inevitably involves detecting a change in the physical properties of the device in the event of mechanical interference or chemical damage.

It is known in the art that anti-counterfeit labels can be made from multilayered materials (or laminates) that interact with light by multilayered interference in a predetermined manner. This gives rise to a characteristic reflection spectrum that varies according to the angle from which the laminate is viewed. These materials are also referred to as iridescent materials.

Multilayered materials are typically fabricated by vacuum deposition or co-extrusion from inorganic materials such as silicon oxide, or organic polymers such as poly-carbonate or poly-propylene. The synthesised laminate is often highly complex in structure and therefore difficult to replicate in the absence of the precise knowledge of its original synthesis. As the optical characteristics of the multilayered material is highly specific to the multilayer in question, this makes such multilayers ideal markers of authenticity.

It is known in the art that thin film multilayers can be used in the detection of tampering (Optical Document Security, Second Edition, Rudolf L. van Renesse, Editor, Artech House, pp. 314 to 315). The art describes how mechanical stress can be used to fracture the multilayer thereby leading to delamination (i.e. change in the nature of the lamination or loss of lamination) and therefore a change in the optical properties of the structure.

Modern iridescent materials suffer from the fact that changes in the reflection spectrum are incremental in nature, as opposed to highly distinct. This lack of contrast limits the applicability of such materials within anti-tamper devices. Further, damage to the iridescent material itself on mechanical or other stress, leads to an unpredictable change in the iridescence of the label as well as a potential loss in its anticounterfeit qualities after tamper.

The increasing sophistication of counterfeiting and tampering means that there is a requirement for the development of alternative and enhanced means of utilising the above anti-tamper mechanism.

Accordingly there is provided a security label wherein the label comprises a layered structure consisting of a first layer (1) to which is adhered a second layer (2) so arranged with respect to layer (1) that light interacts with both the first layer (1) and the second layer (2) and gives rise to a detectable pre-determined wavelength spectrum and wherein said second layer (2) is detachable from said first layer (1) in the event of mechanical friction, chemical interaction, abrasion or any other form of material damage or structural alteration and giving rise on the detachment of second layer (2) to a detectable and pre-determined angular change in the wavelength spectrum.

In an embodiment of the invention the first layer (1) consists of an iridescent laminated or multilayered material that exhibits an angular dependence in its coloration in reflection and/or transmission (i.e. it is iridescent).

In another embodiment the second layer (2) consists of a lenticular layer which acts as a filter to light of a given angle of incidence. The lenticular layer typically comprises a plurality of lenses, prisms or grooves, although other shapes which give rise to the angular filtration of the incident light are also possible.

In an arrangement of the foregoing embodiments the first layer (1) consists of an iridescent laminate and the second layer (2) consists of a lenticular layer.

In a further arrangement the first layer (1) is arranged such that the geometric orientation of the second layer (2) is reversed with respect to the first layer (1).

The multilayer substrate confers highly specific iridescent properties on the security label, whereas the lenticular superstrate filters the light incident on the label according to angle of incidence. The angular filtration of the lenticular layer lowers the apparent iridescent properties of the multilayer substrate, which has the further effect of broadening the angle over which a given wavelength spectrum (or colour) is observed over the label as a whole. This enhances the perceived colour contrast when the label is viewed from grazing incidence to normal incidence to the surface, as the colour change, is no longer incremental in nature, but visually more abrupt. The optical effect can be constant in one plane with a single-array grooved lenticular screen such as a monograting or azimuthally invariant in the case of a two dimensional array of lenses.

The angular filtration of the incident light by the lenticular layer has the effect of shifting the observed wavelength spectrum. That is, a spectrum that was viewed at a given viewing angle in the absence of the lenticular layer, may be observed in similar profile at a different viewing angle in the presence of the lenticular layer. The wavelength shift between coated and non-coated multilayer becomes a known optical characteristic of the label.

The presence or absence of the lenticular layer therefore significantly modifies the observed wavelength reflection spectrum from the label at a given viewing angle. Consequently, a detachment of the lenticular layer from the multilayer leads to a significant, but tailored, change in the colour of the reflected light from the label. The multilayer, however, can be resilient and survive the process to continue acting as an iridescent marker. The label therefore acts as an anti-tamper device, where detachment occurs as a result of physical interference with the label, but at the same time maintains its properties of anti-counterfeit detection, irrespective of whether the lenticular layer is attached to the multilayer or not. In an anti-tamper label the lenticular layer may be embedded into the object being protected, or coated in flake form as an ink.

The contrast in colour between the combined layers and the multilayer, taken in isolation, can be used to further advantage in terms of logo design. This may be achieved either by embossing the design in the form of the logo onto the multilayer, or alternatively by etching the laminated layer away from the multilayer to the desired logo.

The detachment of the lenticular layer from the laminated layer as described in the foregoing arrangements, may also be used for anti-counterfeiting detection (as opposed to anti-tamper detection). This enables the label to be incorporated within quality seals, for example the breakable tape surrounding a packet of cigarettes, the deliberate breakage of which would give rise to a pre-determined change in the reflection wavelength spectrum which would be highly noticeable to the eye.

The level of strain that the device can withstand can be set by the properties of the lenticular screen, for example a brittle lenticular screen for the snapping action of a bottle top. Alternatively, a delicate thin film lenticular screen could be used to detect finger-contact with electronic components.

The lenticular layer or the multilayer may be configured in reverse geometric orientation with respect to the other in order to obtain the physical effects of colour contrast as described above.

The above applications could be used overtly in the case of visible colour changes in the reflected light or covertly in the case where the changes in wavelength occur outside of the visible range of the spectrum.

The underlying laminated layer, in conjunction with the lenticular layer, renders the label difficult to replicate, which has the advantage of increasing the overall complexity of the device as a whole. This, therefore, increases the difficulty of counterfeit, as replication of the physical behaviour of the label necessitates not only replication of the multilayer, but also replication of the lenticular layer.

The use of flake inks, and the ease of adhering the lenticular layer to the laminated substrate, via low pressure embossing techniques, enables the security label to be made at low cost; an advantage over inorganic thin films which may require high temperatures and low pressures for deposition.

An embodiment of the invention will now be described by way of example and with reference to the accompanying drawings in which.

Figure 1:
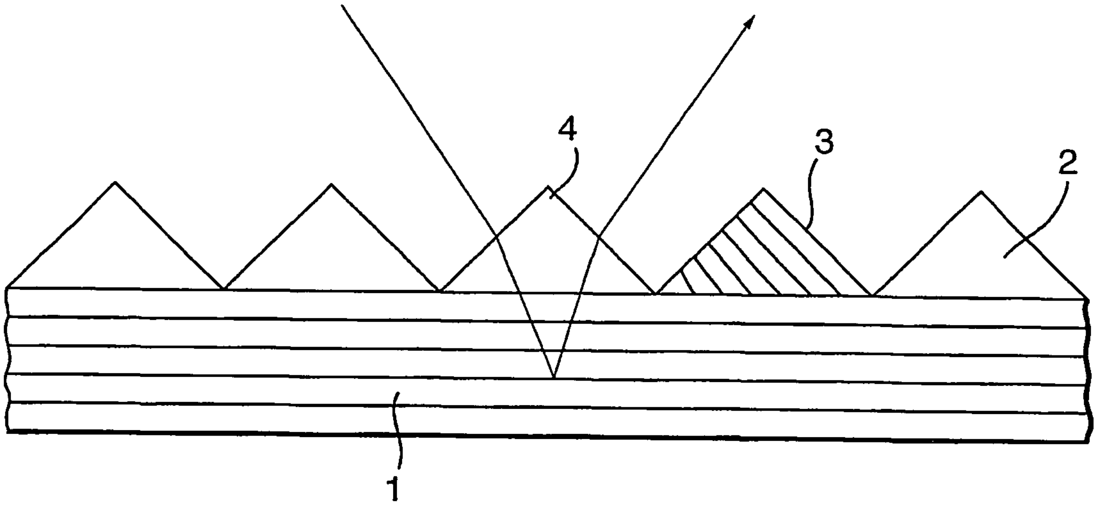
FIG. 1 shows a cross section of the Security Label.

An example of the security label is illustrated by way of cross section in FIG. 1. The first layer (1) comprises a multilayer iridescent material which exhibits a strong angle dependence in its coloration in transmission and/or reflection. The multilayer is made from OCLI/FLEX Chromaflair paint and is available from Flex Products Ltd, Saracens House, 25 St. Margaret's Green, Ipswich, Suffolk. IP4 2BN. A second layer (2) is a lenticular transparent radiation beam-steering material which is constructed from an array of micro prismatic or ridged lenses (3) each prism having an outer right angle (4). This material, referred to as Transparent Right Angle Film (TRAF), is available from 3M United Kingdom Plc, Customer Technical Centre, Easthampstead Road, Bracknell, Berks. RG12 1JE. The first layer may be adhered to the second layer through the use of a transparent adhesive, or, for the purpose of optical analysis, it may be simply laid over the second layer.

Figure 2:
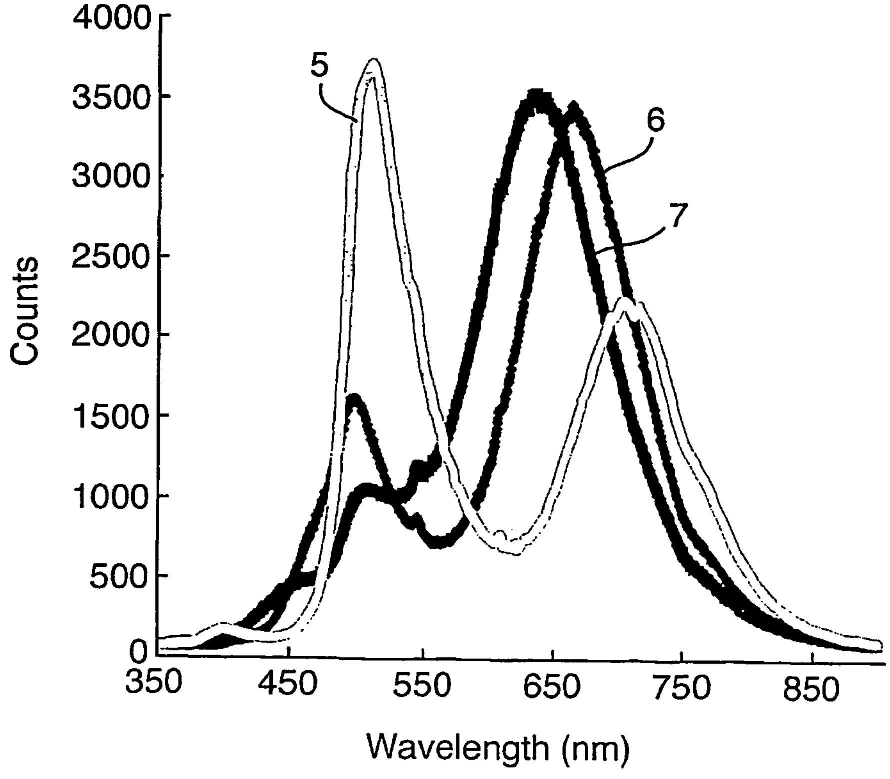
FIG. 2 shows the effect on the reflection spectrum of a Green/Purple multilayer by adding a lenticular superstrate.

The optical effect of combining the lenticular layer (2) with the multilayer (1) is illustrated by FIG. 2.

Note: In FIGS. 2-5 references to the incidence angle relate to the viewing angle as measured from the normal to the surface. Therefore, "0° incidence angle" means "viewed from normal to the surface" and "60° incidence angle" means that the angle between the viewing direction and the normal to the surface is 60°.

In this case the multilayer used was the Green/Purple multilayer, available from Flex Products Ltd. (as above). The multilayer when viewed at 0° incidence angle (in the absence of lenticular layer), as shown in spectrum (5), appears green in colour. However, when the multilayer (in the absence of lenticular layer) is viewed at 60° incidence angle, as shown in spectrum (6), it appears purple. In other words, spectrum (5) shows a peak in the short wavelength region at about 520 nm (green) which disappears in spectrum (6), although no reduction in reflection is observed at the red end of the spectrum. Consequently, moving the viewing angle to the surface normal of the multilayer from 0° to 60° leads a change in the colour of the reflected light from green to purple.

FIG. 2 illustrates that when the lenticular layer is laid over the multilayer and viewed at 0° incidence angle, as shown in spectrum (7), the reflected colour changes from green to purple—that is, the addition of the lenticular layer has the equivalent effect, as if the viewer had observed the multilayer from a viewing angle of 60° to the surface normal, in the absence of a lenticular superstrate. It is to be noted that likewise the spectrum which is obtained (7), for the combination of multilayer and lenticular layer at normal incidence, closely resembles spectrum (6), which was obtained in the absence of a lenticular layer, and at a viewing angle of 60°. In effect, therefore, the lenticular layer has had the equivalent effect of shifting the observed refection spectrum to that obtained at a viewing angle of 60°. This may be referred to as an angular change in the reflected wavelength spectrum. Moreover, the angular change may be predetermined—in the instant example being 60°.

Figure 3:
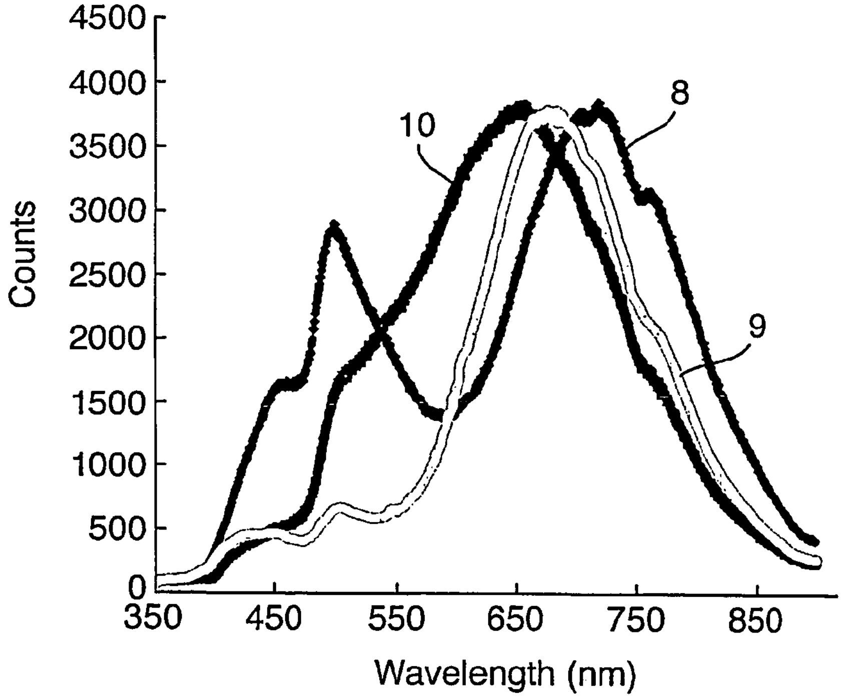
FIG. 3 shows the effect on the reflection spectrum of a Blue/Red multilayer by adding a lenticular superstrate.

A similar effect to that observed in FIG. 2, is also found to occur for the Blue/Red multilayer as shown in FIG. 3. In FIG. 3, spectrum (8) shows the wavelength spectrum that is obtained when the Blue/Red multilayer is viewed from 0° incidence angle, optically this appears purple to the eye (the manufacturer refers to this colour as blue). The reflection spectrum changes to magenta (the manufacturer refers to this colour as red), however, when the multilayer is viewed from 60° incidence angle, as shown by spectrum (9). The addition of the lenticular layer to the multilayer has the effect that, when the combined multilayer and lenticular layer is viewed from 0° incidence angle, the observed colour changes from purple to the magenta colour which had been previously observed at 60° incidence angle in the absence of the lenticular layer. Thus the significant peak at about 510 nm is no longer present in the spectrum and the observed spectrum (10) is found to be similar to spectrum (9) in profile.

The tampering of a label constructed from the combined multilayer and the lenticular layer in the manner shown in cross section by FIG. 1, would therefore lead to the reverse of the observed colour change from purple to green for the Green/Purple multilayer, and magenta to purple for the Blue/Red multilayer when the device was viewed from a 0° incidence angle. In the same manner, the Green/Purple multilayer when viewed from 60° incidence angle would change in colour from purple to green and the Blue/Red multilayer would change from purple to magenta. This colour change would be highly noticeable to the human eye and is, therefore, an effective means of detecting tamper. Meanwhile, the underlying multilayer would retain its anticounterfeit properties after tamper as the multilayer would remain iridescent. The label therefore comprises dual functionality of both tamper and anticounterfeit detection and retains this dual functionality irrespective of whether tampering has occurred or not.

Figure 4:
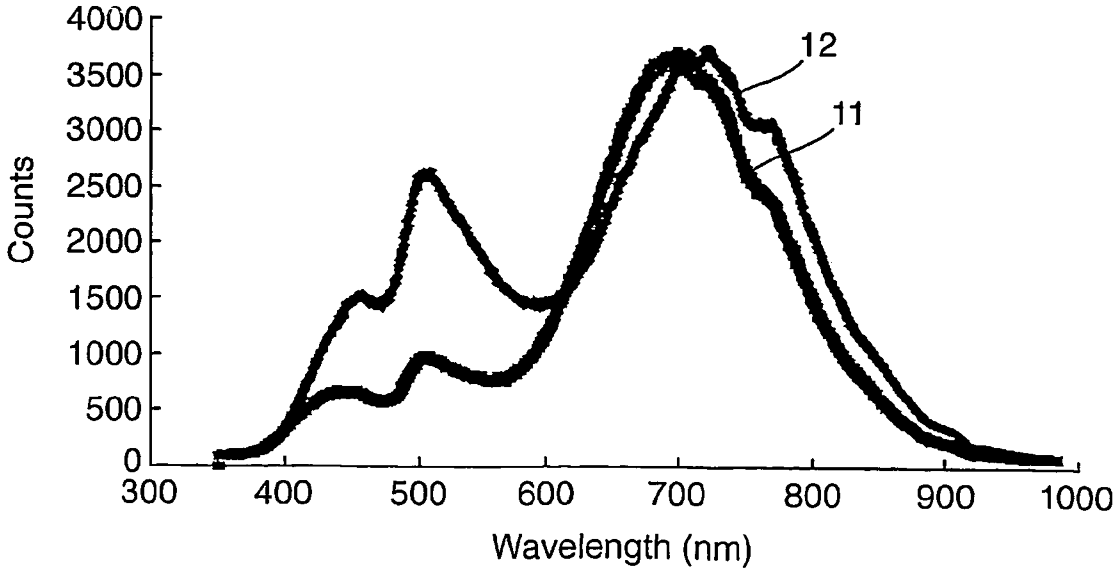
FIG. 4 shows the reflection spectra that are obtained for a Blue/Red multilayer (in the absence of lenticular layer) at normal incidence to the surface, and at 45° to the surface.

In FIG. 4 spectrum (11) shows the wavelength spectrum that is obtained from the Blue/Red multilayer when viewed at a 45° incidence angle in the absence of a lenticular superstrate. The multilayer appears magenta to the eye at 45°. Spectrum (12) is the wavelength spectrum that is obtained when the same multilayer, again in the absence of lenticular superstrate, is viewed at 0° incidence angle. At a 0° incidence angle the multilayer appears purple. A comparison of the two spectra shows that rotation of the viewing angle leads to a significant change in the wavelength spectrum in the region of 350 nm to 600 nm i.e. the blue end of the spectrum. There also exists a disparity in the profiles at higher wavelength, although this is less significant. The change in the wavelength spectrum manifests itself as a change in colour of the multilayer over this change in viewing angle (45° view rotation) from magenta at 45° to purple at 0°.

Figure 5:
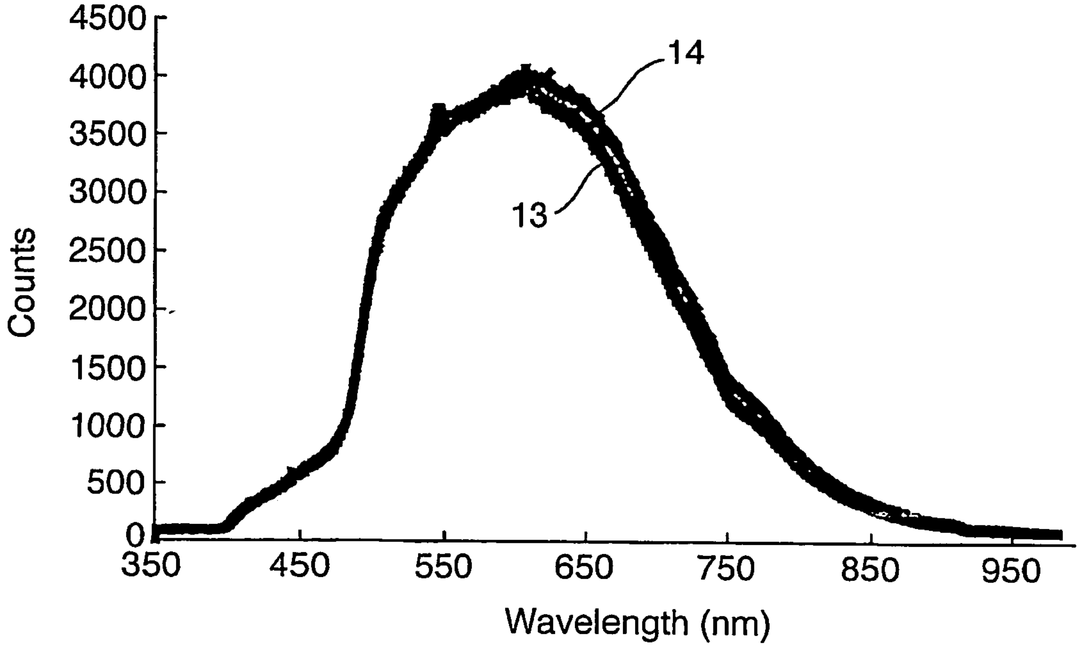
FIG. 5 shows the reflection spectra obtained for a Blue/Red multilayer in the presence of lenticular superstrate at normal incidence to the surface, and at 45° to the surface.

The observed marked change in colour and spectrum with viewing angle for the multilayer is to be compared with the spectra obtained over the same change in viewing angle for a multilayer used in conjunction with a lenticular superstrate, the results for which are shown in FIG. 5. FIG. 5 shows the wavelength spectra that are obtained at the same viewing angles as to those undertaken in FIG. 4, but in the presence of a lenticular superstrate. Spectrum (13) was obtained when the label was viewed at 45° to the surface and spectrum (14) was obtained when the label was viewed at 0° incidence angle. The two spectra can be seen to be almost identical and there is no observed colour change over this angular variation of view, both structures appearing purple to the eye.

The optical action of the lenticular superstrate on the multilayer substrate, is to rotate, through a given viewing angle, the perceived colour of light reflected from the multilayer. Although this rotation is not absolutely precise, as the observed wavelength spectra do not precisely coincide, to the eye, the observed colour change is perceived as such a rotation. The lenticular layer also extends the observed angular range over which a given colour is viewed by the eye. This occurs as the lenticular layer reduces the iridescence of the multilayer. The effect of this reduction in iridescence, as far as the perception of the viewer is concerned, is to enhance the optical contrast between the lenticular coated and uncoated regions of the multilayer. This, therefore, facilitates analysis by the eye in the event of tampering with the label.

The invention claimed is:

1. A security label wherein the label comprises a layered structure consisting of a first layer to which is adhered a second layer so arranged with respect to the first layer that light interacts with both the first layer and the second layer and gives rise to a detectable pre-determined wavelength spectrum and wherein said second layer is detachable from said first layer in the event of mechanical friction, chemical interaction, abrasion or any other form of material damage or structural alteration and giving rise on the detachment of the second layer to a detectable and pre-determined angular change in the wavelength spectrum.

2. A securily label according to claim 1 wherein the first layer consists of an iridescent laminated material that exhibits an angular dependence in its coloration in reflection and/or transmission.

3. A security label according to claim 1, wherein the second layer consists of a lenticular layer which acts as a filter to light of a given incident angle.

4. A security label according to claim 1, wherein the first layer comprises a multilayer iridescent material and the second layer comprises an array of micro prismatic or ridged lenses each prism having an outer right angle.

5. A security label as claimed in claim 4, wherein the second layer overlays the first layer.

6. A security label according to claim 1, wherein the second layer comprises a brittle lenticular layer.

7. A security label according to claim 1, wherein the second layer comprises a lenticular layer comprising a plurality of prisms.

8. A security label wherein the label comprises a layered structure consisting of a iridescent layer to which is adhered a lenticular layer so arranged with respect to the iridescent layer that light interacts with both the iridescent layer and the lenticular layer and gives rise to a detectable pre-determined wavelength spectrum and wherein said lenticular layer is detachable from said iridescent layer in the event of mechanical friction, chemical interaction, abrasion or any other form of material damage or structural alteration and giving rise on the detachment of the lenticular layer to a detectable and pre-determined angular change in the wavelength spectrum.

* * * * *